Oct. 23, 1956   R. E. GREENOUGH   2,768,036
SECTIONAL FLUID SEAL
Filed Nov. 14, 1955

INVENTOR.
RAYMOND E. GREENOUGH
BY
ATTORNEY

United States Patent Office 2,768,036
Patented Oct. 23, 1956

2,768,036
SECTIONAL FLUID SEAL

Raymond E. Greenough, Berea, Ohio, assignor to The Cleveland Pneumatic Tool Company, Cleveland, Ohio, a corporation of Ohio Application November 14, 1955, Serial No. 546,591

9 Claims. (Cl. 309—23)

This invention relates generally to fluid seals or packings and more particularly to a new and improved fluid packing of the type known as O rings disclosed in the U. S. Patent 2,180,795.

It is an important object of this invention to provide a new and improved O ring type packing which is substantially immuned to spiral failures.

It is another important object of this invention to provide a resilient packing formed of an assembly of segments each having a substantially circular cross-section, which segments cooperate to form a torus shaped packing or O ring.

Further objects and advantages will appear from the following description and drawings, wherein.

Figure 1:
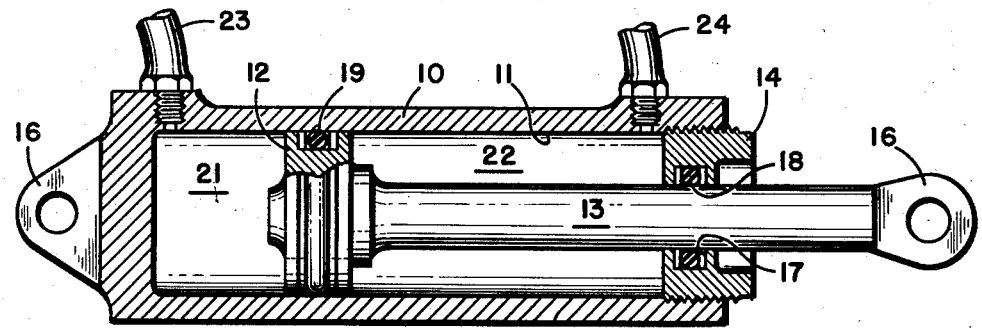
Figure 1 is a side elevation in longitudinal section of a typical fluid actuator incorporating packings according to this invention.

O ring type packings or seals are used to provide a fluid tight joint between two longitudinally movable members. Such a use is found in fluid motors of the piston and cylinder type wherein an O ring is mounted on the piston head to provide a fluid seal between the piston head and the cylinder walls. It is also quite customary to use such a seal to prevent leakage of fluid along the piston rod where it passes through the gland member. Such seals function satisfactorily providing sufficient lubrication is present to prevent scoring, pinching or twisting of the seal when the fluid motor is of a hydraulic type wherein the hydraulic oil has satisfactory lubricating qualities. However, in pneumatic motors where the packing must operate essentially dry, difficulty is often encountered in that friction causes the seal to twist to a point where it ruptures. Such failures are known as spiral failures, and it is the purpose of this invention to produce an O ring type packing which will be relatively immune to such spiral failures even when operating in devices where there is little or no lubrication.

Reference should now be made to the drawings wherein a typical fluid actuator is shown which comprises a cylinder 10 formed with an axial cylinder wall 11 and a piston head 12 mounted on one end of a piston rod 13 for movement along the cylinder wall 11. A gland member 14 is threaded into one end of the cylinder 10 and provides lateral support for the piston rod 13 while permitting relative axial motion thereof. Both the piston rod 13 and cylinder 10 are formed with mounting portions 16 so that the fluid motor may be connected to an external load. The gland member 14 is provided with an annular groove 17 in which is positioned an O ring type packing 18 according to this invention which prevents leakage of fluid out of the cylinder along the piston rod 13. The piston head 12 is also formed with an annular groove in which an O ring type packing 19 according to this invention is positioned which prevents flow of fluid past the piston head. The piston head divides the cavity within the cylinder 10 into a first chamber 21 and a second chamber 22 which are adapted to be connected to a source of fluid pressure through pressure lines 23 and 24 respectively. The fluid motor functions in the conventional manner in that pressure fluid supplied to the chamber 21 produces a force urging the piston rod 13 to the right, and pressure fluid supplied to the chamber 22 produces a force on the piston rod 13 urging it to the left.

Figure 2:
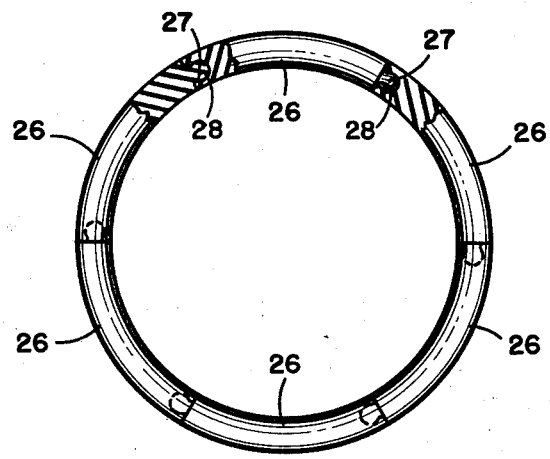
Figure 2 is an enlarged view partially in section of the preferred form of packing according to this invention; and, Figure 3 is an enlarged fragmentary section of the preferred connection between the segments of the packing.
Figure 3:
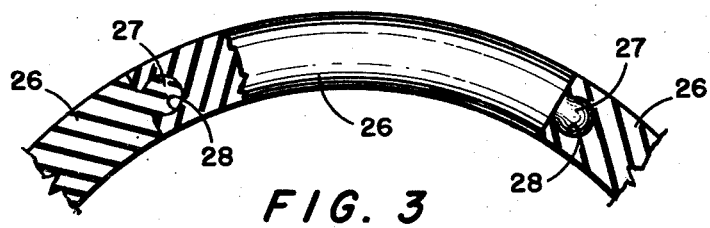

Reference should now be made to Figures 2 and 3 for a clear understanding of the structure of the preferred packing according to this invention. It should be understood that both the packings 18 and 19 shown in Figure 1 have the same structure even though they are of different size. The packings 18 and 19 are made up of a series of segments 26 each having a circular cross-section which cooperate to form a torus shaped ring. The segments 26 are interlocked at their ends by means of a spherical projection or ball 27 which is positioned within a spherical recess or socket 28 formed in the end of the adjacent segment. By utilizing this ball and socket structure, the natural resiliency of the material utilized to form the segments, firmly secures the segments together. Normally, the seal segments are formed of a rubber like material which may be a synthetic plastic or the like. Each of the segments is formed with a spherical projection 27 at one end and a spherical recess 28 at the other end so that the assembled segments which are all identical will form a closed torus shaped packing.

If the piston head 12 and the piston rod 13 move back and forth within the cylinder 10, there is sometimes a tendency for one portion of the seal to grab with the result that that portion of the seal will rotate around its longitudinal center line. Because of the ball and socket connection between the segments, one or more segments may rotate relative to the others. For this reason the individual segments may rotate without causing failure of the seal by rupture or the like. If however the seal were made as a single unitary piece, rotation of one portion when other portions do not rotate would cause a wind up of the material and cause a rupture or spiral failure.

It is preferable to mold the segments as straight cylinders when they are unstressed and deflect them into an arcuate shape during assembly so that relative rotation between segments will not change the stresses at the joint between adjacent segments.

There will be no leakage between adjacent segments because the packing is compressed by the fluid being sealed with sufficient force to cause the ends of the segments to be maintained in tight engagement. Also, it is preferable to arrange the proportions of the piston, cylinder and packing so that the circumference of the packing is compressed to a limited degree when it is installed in the device. An O ring type packing formed in the manner taught by this invention permits the assembly of a large variety of seal sizes with a given size segment. If a larger diameter packing is desired, it is merely necessary to use more segments, or conversely, if a smaller diameter packing is desired, it is merely necessary to reduce the number of segments. It should be understood that various means may be used to join adjacent ends of the seal segments so long as relative rotation between adjacent segments is permitted in the installed packing.

Although a preferred embodiment of this invention is illustrated, it will be realized that various modifications of the structural details may be made without departing from the mode of operation and the essence of the invention. Therefore, except insofar as they are claimed in

I claim:

1. A packing adapted to provide a fluid seal between two elongated members longitudinally movable relative to each other comprising a series of segments having a circular cross-section formed of resilient material, and means maintaining said segments in an end to end relationship to form a torus shaped packing, the individual segments being capable of independent rotation around their own longitudinal center line.

2. A packing adapted to provide a fluid seal between two elongated members longitudinally movable relative to each other comprising a series of cylindrical segments having a circular cross-section formed of resilient material, said segments being positioned in an end to end relationship to form a torus shaped packing, and connecting means between adjacent segments maintaining said end to end relationship while permitting said segments to independently rotate about their own center line.

3. A packing adapted to provide a fluid seal between two elongated members longitudinally movable relative to each other comprising a series of straight cylindrical segments formed of resilient material, and means maintaining segments in an end to end relationship and deflected from their unstressed straight condition to form a torus shaped packing wherein individual segments may rotate independently around their own longitudinal center line.

4. In combination cooperating piston and cylinder members capable of relative axial motion, an annular groove formed in one of said members open to the other of said members, a resilient packing in said groove providing a fluid seal between said members, said packing including a plurality of similar segments having a circular cross-section assembled to form a torus shape packing wherein individual segments may independently rotate around their own longitudinal center line.

5. In combination cooperating piston and cylinder members capable of relative axial motion, an annular groove formed in one of said members open to the other of said members, a resilient packing in said groove providing a fluid seal between said members, said packing including a plurality of identical segments having a circular cross-section assembled to form a torus shape wherein individual segments may independently rotate around their own longitudinal center line, and means connecting the ends of each segment with the ends of adjacent segments, said connecting means permitting said independent rotation.

6. In combination cooperating piston and cylinder members capable of relative axial motion, an annular groove formed in one of said members open to the other of said members, a resilient packing in said groove providing a fluid seal between said members, said packing including a plurality of similar segments having a circular cross-section assembled to form a torus shape packing wherein individual segments may independently rotate around their own longitudinal center line, and a spherical projection on one end of said segments and a spherical recess on the other end, said segments being assembled with each projection positioned within the recess in the adjacent segment to connect adjacent segments while permitting independent rotation thereof around their own longitudinal center line.

7. A torus shaped packing formed of a plurality of end to end connected segments capable of individual rotation on their own longitudinal center axis.

8. A torus shaped packing formed of a plurality of end to end connected identical segments individually rotatable on their own longitudinal center axis.

9. A torus shaped packing formed of a plurality of segments, and means integral with each segment connecting its ends with the ends of adjacent segments and enabling individual rotation of the segments on their own longitudinal center axis.

References Cited in the file of this patent

UNITED STATES PATENTS

| 2,201,739 | Nicholson | May 21, 1940 |
| 2,317,034 | Dalkin | Apr. 20, 1943 |

FOREIGN PATENTS

| 476,019 | Great Britain | Nov. 30, 1937 |